United States Patent
Zhang et al.

(10) Patent No.: US 8,207,840 B2
(45) Date of Patent: Jun. 26, 2012

(54) METHOD AND APPARATUS TO ESTIMATE AUTOMOTIVE ALTERNATOR BELT SLIP AS A FUNCTION OF BATTERY VOLTAGE

(75) Inventors: Yilu Zhang, Northville, MI (US); Satish Rajagopalan, Knoxville, TN (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 546 days.

(21) Appl. No.: 12/497,742

(22) Filed: Jul. 6, 2009

(65) Prior Publication Data

US 2011/0000421 A1    Jan. 6, 2011

(51) Int. Cl.
*G08B 21/00* (2006.01)

(52) U.S. Cl. .................................. 340/455; 340/438
(58) Field of Classification Search .............. 340/425.5, 340/438, 455; 56/10.2 R; 477/44; 701/51
See application file for complete search history.

(56) References Cited

U.S. PATENT DOCUMENTS

| 5,855,108 A | 1/1999 | Salz et al. |
| 7,174,245 B2 | 2/2007 | Ries-Mueller et al. |

*Primary Examiner* — Jeffery Hofsass

(57) ABSTRACT

An embodiment contemplates a method for determining belt slip in a vehicle. The vehicle includes an engine and an alternator rotatably coupled by an accessory drive belt. The accessory drive belt engaging a rotating member of the engine for driving a rotating member of the alternator. A battery voltage is measured. An estimated battery voltage is determined as a function of engine speed. The belt slip of the alternator is detected in response to a comparison of the estimated battery voltage and the measured battery voltage.

20 Claims, 4 Drawing Sheets

METHOD AND APPARATUS TO ESTIMATE AUTOMOTIVE ALTERNATOR BELT SLIP AS A FUNCTION OF BATTERY VOLTAGE

BACKGROUND OF INVENTION

An embodiment relates generally to detecting belt slip of an accessory drive belt of an engine in a vehicle.

Vehicle front end accessory drive systems for vehicles typically use a flexible rubberized belt for driving a plurality of engine accessory devices such the alternator, air conditioning compressor, power steering pump, and water pump. The engine crankshaft generates a torque and drives the respective engine accessory devices via the accessory drive belt. The belt typically takes on a serpentine shape due to the relative placement of the engine accessory devices. The belt engages a pulley on each of the devices with a required tension so that belt slippage does not occur between the belt and one or more of the engine accessory devices. Belt slippage may occur due to a worn belt, broken, or an improperly tensioned belt. An improperly tensioned belt could result in a low battery charge caused by less rotation of the alternator, misdiagnosis of accessory system failures, inadequate cooling of the engine, or engine failure.

SUMMARY OF INVENTION

An advantage of an embodiment includes a method and system for detecting slip of an accessory drive belt using a measured battery voltage and an estimated battery voltage where the estimated battery voltage is a function of engine speed. The belt slip detection system and method eliminates the requirement of additional sensors which would otherwise increase the cost of the system.

An embodiment contemplates a method for determining belt slip in a vehicle. The vehicle includes an engine and an alternator rotatably coupled by an accessory drive belt. The accessory drive belt engages a rotating member of the engine for driving a rotating member of the alternator. A battery voltage is measured. An estimated battery voltage is determined as a function of engine speed. The belt slip of the alternator is detected in response to a comparison of the estimated battery voltage and the measured battery voltage.

An embodiment contemplates a belt slip detection system for detecting slippage of an accessory drive belt. The accessory drive belt engages a rotatable member of an engine for driving a rotatable member of an alternator. The belt slip detection system includes a control module configured for determining a belt slip of the alternator as a function of a measured battery voltage and an estimated battery voltage. The estimated battery voltage is determined as a function an engine speed. The control module determines whether the estimated battery voltage is greater than the measured battery voltage. The control module is configured to enable a driver-perceptible warning concerning the belt slip.

An embodiment contemplates a method for determining belt slip in a vehicle. The vehicle includes an engine and an alternator rotatably coupled by an accessory drive belt. The accessory drive belt engages a rotating member of the engine for driving a rotating member of the alternator. An engine speed is measured. An expected alternator speed is determined as a function of engine speed. A battery voltage is measured. A calculated alternator speed is determined as a function of the measured battery voltage. Belt slip is detected in response to a comparison of the calculated alternator speed and the expected alternator speed.

DETAILED DESCRIPTION

Figure 1:
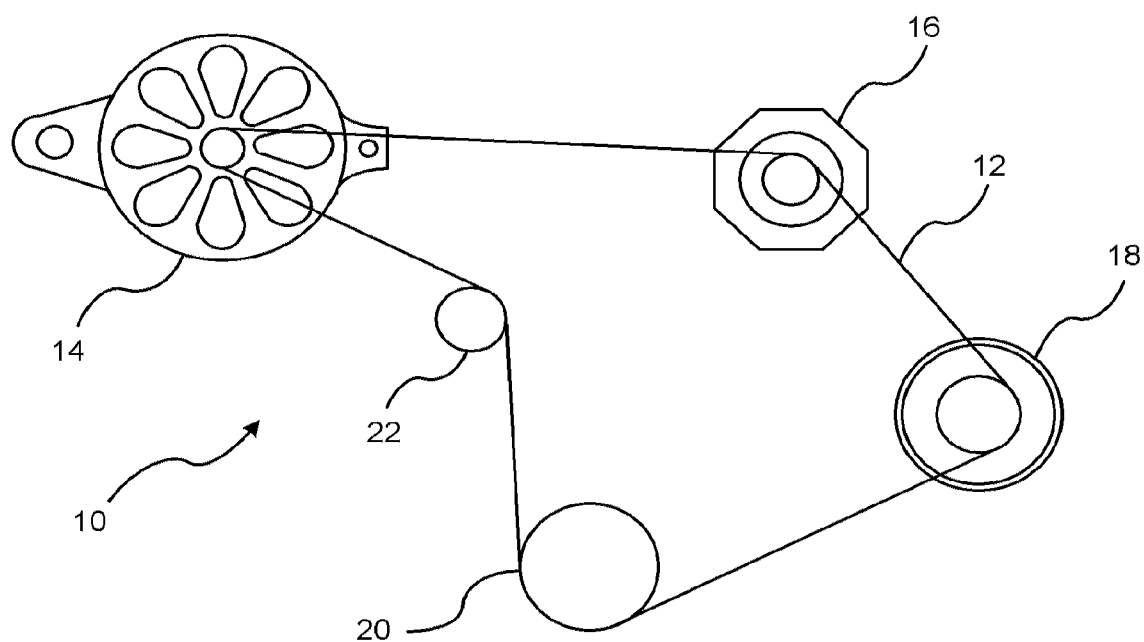
FIG. 1 is a schematic of a front end accessory drive system according to an embodiment of the invention.

There is shown generally at 10 a vehicle front end accessory drive system. An accessory drive belt 12 is rotatably engaged to a plurality of accessory components. The plurality of components includes, but is not limited to, an alternator 14, a power steering pump 16, and an air compressor 18. An engine crankshaft 20 is also rotatably coupled to the accessory drive belt 12 for driving each of the plurality of accessory components. The engine crankshaft 20 and the plurality of components each include a rotatable member, such as a pulley, for engaging the accessory drive belt 12. The torque generated by the engine crankshaft 20 is transmitted through the accessory drive belt 12 for rotatably driving each of the plurality of components. A belt tensioner 22 is used to provide tension to the accessory drive belt 12 to absorb slack for minimizing belt slip.

Figure 2:
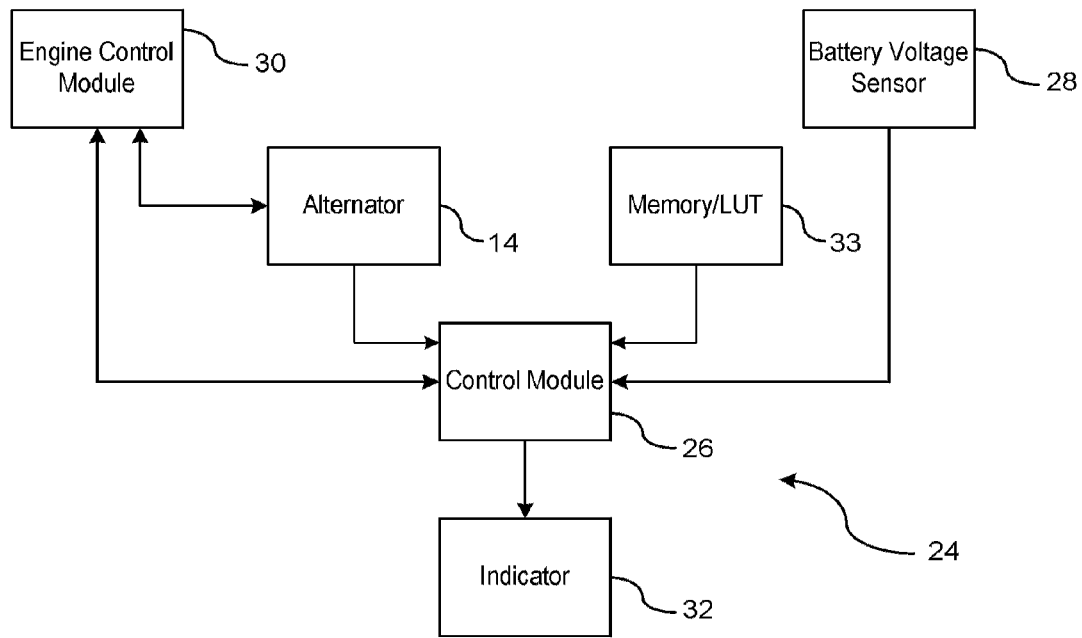
FIG. 2 is a block diagram of a belt slip detection system according to an embodiment of the invention.

FIG. 2 illustrates a belt slip detection system 24 for detecting belt slip of the accessory drive belt 12 of the engine when either a worn or broken belt is present, or if the tension is not adequate to prevent belt slip. The belt slip detection system 24 includes a control module 26, a battery voltage sensor 28, an engine control module 30, a warning indicator 32, and an alternator 14.

The control module 26 interfaces with the various components of the belt slip detection system 24 for determining whether belt slip is occurring. The control module 26 may be a standalone module, or may be an existing control module used in the vehicle such as a battery control module. A battery control module (e.g., in a hybrid vehicle) performs charging control and enhances vehicle power management for controlling and distributing power in a vehicle electrical system, and therefore, many of the monitored characteristics described herein may be provided by the battery control module. The control module 26 receives input from a battery voltage sensor 28 that measures the voltage of the battery. In addition, electrical operating characteristics that are monitored by the engine control module (ECM) 30 which will be discussed later are provided to the control module 26 for determining belt slip. An indicator 32 providing a driver-perceptible warning, such as a warning light, indicates that belt slip is occurring which may lead to incorrect charging of the battery, decreased fuel efficiency, mis-diagnosis of the problem (e.g., replacement of the alternator), improper cooling of the engine, or damage to the engine.

Figure 3:
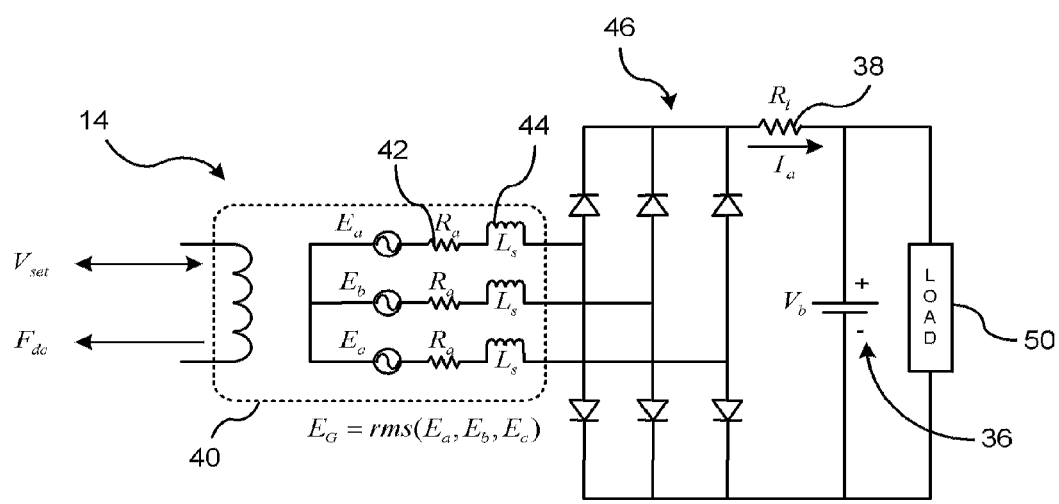
FIG. 3 an electrical schematic a recharging system for a vehicle according to an embodiment of the invention.

FIG. 3 illustrates an electrical schematic of the charging system of a vehicle. A load 34 is coupled to a battery 36. The battery 36 is electrically coupled to the alternator 14 for re-charging the battery 36. The electrical conduit coupling the battery 36 includes a line resistance 38. The alternator 14 includes a stator 40 which when rotated induces an electromagnetic field of alternating current in the secondary side of the stator 14. Generation of the electromagnetic field of alternating current is initiated by a field generated in the primary side of the stator 40. The ECM 30 demands a set point voltage $V_{set}$ which is substantially equal to the alternator output voltage, due to the voltage regulation done by the alternator voltage regulator. In most contemporary automotive alternators, the alternator voltage regulator is a solid-state device integrated within the alternator itself. The alternator voltage regulator operates by limiting the field (i.e., rotor) current through a duty-cycled field voltage. The field voltage duty cycle is measured as $F_{dc}$. A generated voltage $E_G$ is produced in the secondary side of the stator 14 by the induced electromagnetic field through the stator windings. The generated voltage $E_G$ is the root mean square (rms) of the each of the generated phase voltages ($E_a$, $E_b$, $E_c$). Each respective generated phase voltage is applied through an alternator internal resistance ($R_a$) 42 and a synchronous inductance ($L_s$) 44 for generating an alternating current (AC) on each respective line. Each respective line current is provided to a rectifier 46 for rectifying the alternating current (AC) to a direct current (DC). The summed rectified alternator current ($I_a$) produced from each of the respective line phases is provided to the battery 36 via the alternator-to-battery cable 38 having the line resistance ($R_l$). The battery 36 which drains as a result of electrical loads 50 utilizing energy from the battery 36 is recharged by the rectified DC current provided to the battery 36 from the alternator 14.

Belt slip of the accessory drive belt is determined by monitoring the voltage from the alternator and battery using an alternator steady state model and a line voltage drop model. When the alternator is at steady state, the following equations hold true for the alternator steady state model as follows:

$$V_a = \frac{3\sqrt{6}}{\pi} E_G - \frac{3}{\pi} X_s I_a - 2 R_a I_a \qquad (1)$$

$$E_G = \frac{1}{\sqrt{2}} L_{af} \omega_a I_f = \frac{1}{\sqrt{2}} L_{af} \omega_a c F_{dc} \qquad (2)$$

$$X_s = \omega_a L_s \qquad (3)$$

where $V_a$ is the alternator output voltage, $E_G$ is the rms generated phase voltage, $X_s$ is the synchronous resistance, $I_a$ rectified alternator current, $R_a$ alternator internal resistance, $L_{af}$ is the mutual inductance between one phase winding and the field winding, $I_f$ is the field current, $F_{dc}$ is the alternator field duty cycle, and $L_s$ is the synchronous inductance.

The line voltage drop model is represented by the following equations:

$$V_a - V_b = R_l I_a \qquad (4)$$

$$V_a = V_{set} \qquad (5)$$

$$I_a = \frac{V_{set} - V_b}{R_l} \qquad (6)$$

where $V_a$ is the alternator output voltage, $V_b$ is the battery voltage, $V_{set}$ is set point voltage as demanded by the ECM, $R_l$ is the alternator to battery cable resistance, and $I_a$ is the rectified alternator current.

Once the equations for the steady state model and the line voltage drop are established, equations (2)-(6) may be substituted into equation (1) to solve for the alternator speed $\omega_a$. The following equation represents the alternator speed $\omega_a$ of the rotating alternator utilizing the equations from the steady state model and the line voltage drop:

$$\omega_a = \frac{V_{set} R_l + 2 V_{set} R_a - 2 V_b R_a}{\frac{3\sqrt{3}}{\pi} L_{af} R_l c F_{dc} - \frac{3}{\pi} V_{set} L_s + \frac{3}{\pi} V_b L_s}. \qquad (7)$$

The alternator speed $\omega_a$ which may be represented in rpm's or some other speed measure is represented by the following formula:

$$\omega_a = r \omega_{egn} \qquad (8)$$

where r is the pulley ratio, and $\omega_{egn}$ is the rotational speed of the engine. The engine speed may be monitored by an external sensor such as the one that provides engine speed information to the ECM. Similarly, the speed of the engine may be represented in rpm's or other speed measure.

An estimated battery voltage $V_{b\_est}$ is solved by substituting equation (8) into equation (7). The estimated battery voltage $V_{b\_est}$ is represented by the following formula:

$$V_{b\_est} = \frac{-\frac{3\sqrt{3}}{\pi} L_{af} R_l \omega_{eng} c F_{dc} + \left(2 R_a + \frac{3}{\pi} r \omega_{eng} L_s + R_l\right) V_{set}}{2 R_a + \frac{3}{\pi} r \omega_{eng} L_s}. \qquad (9)$$

It is understood that $F_{dc}$ and $\omega_{egn}$ are measured with sensors, $V_{set}$ is a control signal given by the ECM, $L_{af}$, $L_s$, $R_a$, $R_l$ and r are predetermined constants, and c is a constant relating field duty cycle with the field current. The formula for the estimated battery voltage $V_{b\_est}$ may be represented by the following formula:

$$V_{b\_est} = -c_1 F_{dc} + c_2 \qquad (10)$$

where $c_1$ and $c_2$ represent values determined by the factor from eq. (9) and are represented as follows:

$$c_1 = \frac{-\frac{3\sqrt{3}}{\pi} L_{af} R_l \omega_{eng} c F_{dc}}{2 R_a + \frac{3}{\pi} r \omega_{eng} L_s}, \text{ and} \qquad (11)$$

$$c_2 = \frac{\left(2 R_a + \frac{3}{\pi} r \omega_{eng} L_s + R_l\right) V_{set}}{2 R_a + \frac{3}{\pi} r \omega_{eng} L_s} \qquad (12)$$

To determine if belt slip is occurring, the estimated battery voltage $V_{b\_est}$ is compared to a measured battery voltage $V_b$. If the measured battery voltage $V_b$ is greater than then the estimated voltage $V_{b\_est}$, then the determination is made that belt slip is occurring. Moreover, the larger the measured battery voltage $V_b$ is than the estimated voltage $V_{b\_est}$, the larger the slip. Therefore, for a given voltage set point $V_{set}$ and engine speed $\omega_{egn}$, $V_b$ is linearly related to the field duty cycle $F_{dc}$, and if the linear relationship is maintained, then no belt slip is occurring.

Values $c_1$ and $c_2$ used to estimate battery voltage $V_{b\_est}$ are predetermined and stored in a memory, lookup table, or the like shown at 33 in FIG. 2. That is, for each combination of a respective voltage set point $V_{set}$ and engine speed $\omega_{egn}$, a respective set of values for $c_1$ and $c_2$ may be used to determine the estimated battery voltage $V_{b\_est}$. Therefore, values for $c_1$ and $c_2$ at a respective voltage set point $V_{set}$ and engine speed $\omega_{egn}$ are recursively updated during a learning mode where no belt slip is occurring. The variables $F_{dc}$, $\omega_{egn}$, $V_{set}$ are continuously measured and monitored. For a respective combination of $V_{set}$ and $\omega_{egn}$, a combined set of values $c_1$ and $c_2$ are determined. As data is continuously measured/collected while $V_{set}$ and $\omega_{egn}$ are constant, values $c_1$ and $c_2$ are recursively updated. The values for $c_1$ and $c_2$ are fixed when the recursively updated values $c_1$ and $c_2$ converge. Thereafter, the fixed values $c_1$ and $c_2$ are stored in the memory/look-up table 33 or similar, and in combination with the recorded engine speed and voltage set point. It should be understood that the memory/lookup table 33 can be a standalone memory/lookup table or may be incorporated within the memory of the control module 26 or similar device.

Figure 4:
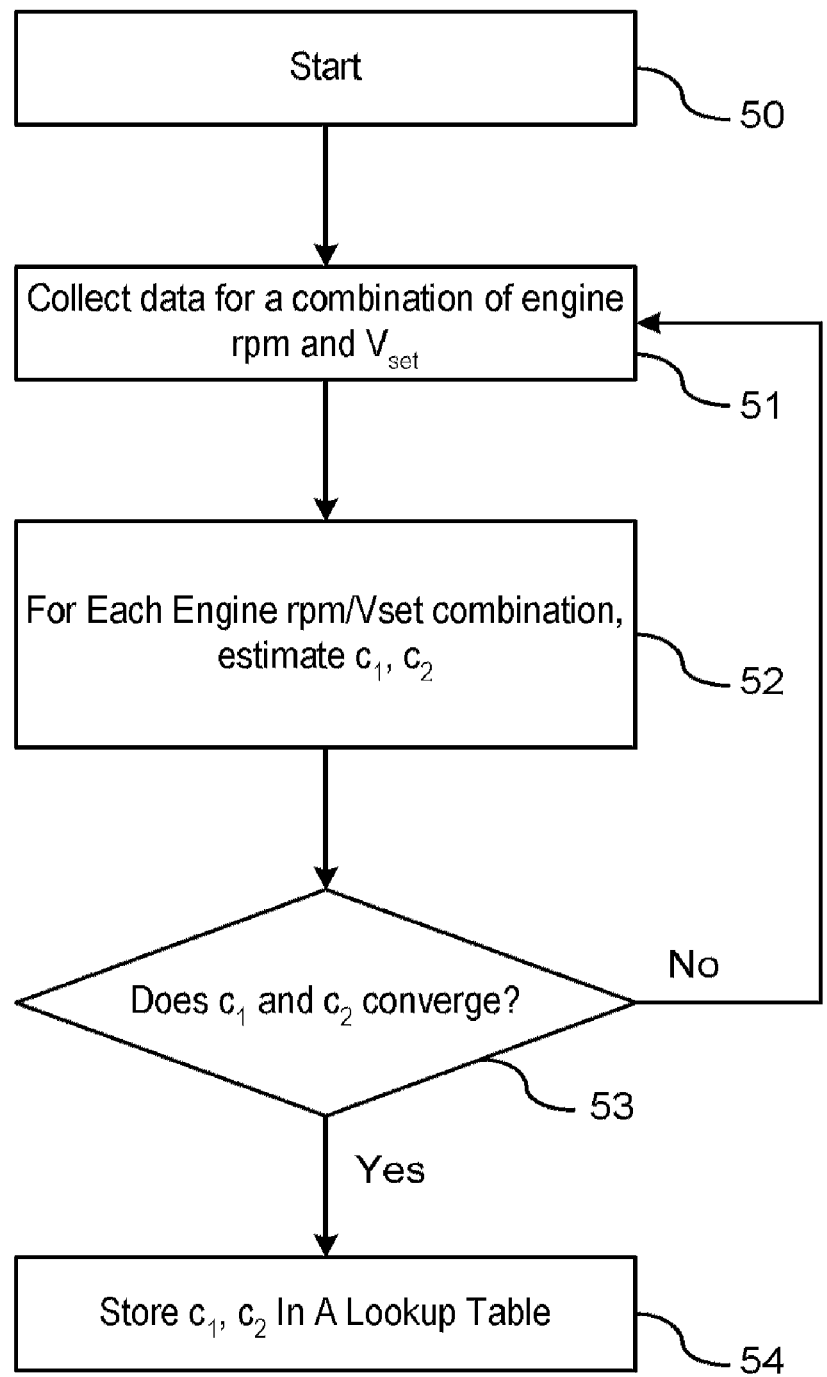
FIG. 4 is a flowchart of a method of a learning program for the belt detection system according to an embodiment of the invention.

FIG. 4 illustrates a flowchart of a method for learning the values $c_1$ and $c_2$. In step 50, the learning program is initiated. In step 51, data relating to $F_{dc}, L_{af}, L_s, R_a, R_l$ and r is collected for a combined set of values $\omega_{egn}$ and $V_{set}$ combination. Engine speed $\omega_{egn}$ is measured with external sensors and the voltage set point $V_{set}$ is a control signal given by the ECM.

In step 52, values $c_1$ and $c_2$ are recursively updated while the engine speed $\omega_{egn}$ and voltage set point $V_{set}$ are constant.

In step 53, a determination is made whether the values for $c_1$ and $c_2$ converge. If a determination is made in step 53 that the values do not converge, then the routine returns to step 51 to collect additional data for obtaining further values for $c_1$ and $c_2$. If the determination is made that the numbers do converge, then the values for $c_1$ and $c_2$ are stored in a lookup table in step 54 for later retrieval by the belt slip detection routine.

Figure 5:
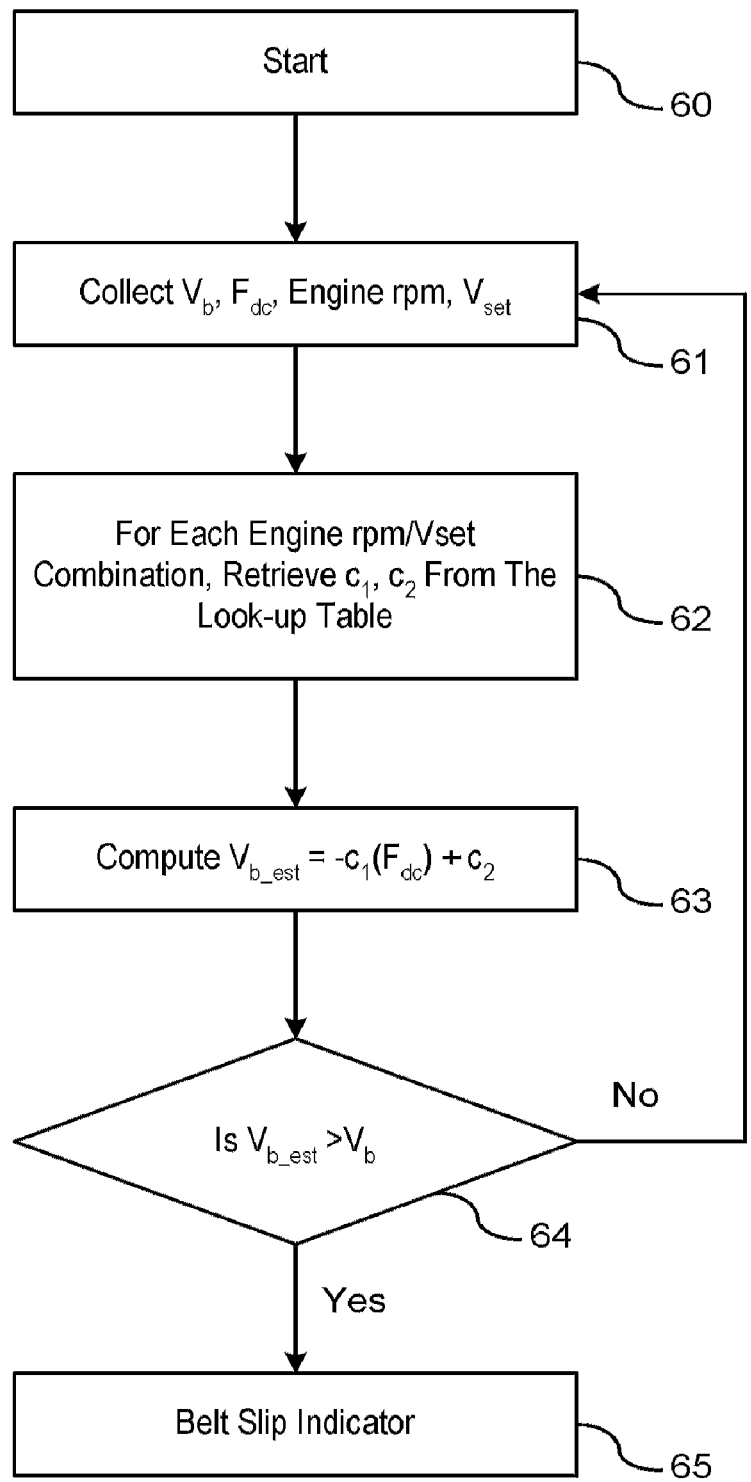
FIG. 5 is a flowchart of a method for detecting belt slip according to an embodiment of the invention.

FIG. 5 illustrates a flowchart of a method for detecting belt slip in a vehicle utilizing a measured battery voltage and an estimated battery voltage that is a function of the engine speed.

In step 60, the belt slip detection routine is estimated. In step 61, data relating to $F_{dc}, V_b, \omega_{egn}, V_{set}$ is collected during vehicle operating conditions.

In step 62, for each combination of engine speed $\omega_{egn}$ and voltage set point $V_{set}$, values for $c_1$ and $c_2$ are retrieved from the lookup table.

In step 63, the estimated battery voltage is determined using the formula shown in equation (10) with the retrieved values $c_1$, $c_2$, and $F_{dc}$.

In step 64, a determination is made whether the estimated voltage $V_{b\_est}$ is greater than the measured battery voltage $V_b$. If the estimated voltage $V_{b\_est}$ is less than the measured battery voltage $V_b$, then the determination is made that no belt slip is occurring and the routine returns to step 61 to collect additional data. If the estimated voltage $V_{b\_est}$ is greater than the measured battery voltage $V_b$, then belt slip is occurring and the routine proceeds to step 65 where a driver-perceptible warning concerning the belt slip is enabled.

In a second embodiment, belt slip may be detected by comparing the expected alternator speed (e.g., assuming no slip) based on engine speed versus an alternator speed calculation based on battery voltage. As describe earlier, an expected alternator speed $\omega_a$ assuming no belt slip is determined by the formula shown in eq. (8). The calculated alternator speed $\omega_{a\_model}$ whether there is belt slip or no belt slip is determined by the following formula in eq. (7). Therefore, belt slip may be determined by the following formula:

$$\omega_{a\_model} - r\omega_{eng} < 0, \text{ or} \quad (13)$$

$$\frac{V_{set}R_1 + 2V_{set}R_a - 2V_bR_a}{\frac{3\sqrt{3}}{\pi}L_{af}R_lcF_{dc} - \frac{3}{\pi}V_{set}L_s + \frac{3}{\pi}V_bL_s} - r\omega_{eng} < 0$$

where $L_{af}$, $L_s$, $R_a$, $R_l$ and r are known constants, and $F_{dc}$, $V_b$, $\omega_{egn}$ and $V_{set}$ are measured data.

Therefore, if the calculated speed of the alternator $\omega_{a\_mod\_el}$ is less than the known/expected speed of the alternator $\omega_a$, then the determination is made that belt slip is occurring. Moreover, the larger the difference between the calculated speed of the alternator $\omega_{a\_mod\_el}$ and the expected speed of the alternator $\omega_a$ (i.e., as a negative value), the larger the slip.

While certain embodiments of the present invention have been described in detail, those familiar with the art to which this invention relates will recognize various alternative designs and embodiments for practicing the invention as defined by the following claims.

What is claimed is:

1. A method for determining belt slip in a vehicle, the vehicle including an engine and an alternator rotatably coupled by an accessory drive belt, the accessory drive belt engaging a rotating member of the engine for driving a rotating member of the alternator, the method comprising the steps of:
    measuring a battery voltage;
    determining an estimated battery voltage as a function of engine speed; and
    detecting belt slip in response to a comparison of the estimated battery voltage and the measured battery voltage.

2. The method of claim 1 wherein the estimated battery voltage is determined as a function of an alternator voltage set point.

3. The method of claim 2 wherein the estimated battery voltage is determined by the following formula:

$$V_{b-est} = -c_1F_{dc} + c_2$$

where $V_{b-est}$ is the estimated battery voltage, $F_{dc}$ is an alternator field duty cycle; $c_1$ is value based on a function of the engine speed, and $c_2$ is a value based on a function of the alternator voltage set point.

4. The method of claim 3 wherein $c_1$ and $c_2$ are retrieved from a look-up table.

5. The method of claim 4 wherein $c_1$ is determined by the following formula:

$$c_1 = \frac{-\frac{3\sqrt{3}}{\pi}L_{af}R_lr\omega_{egn}}{2R_a + \frac{3}{\pi}r\omega_{egn}L_s}$$

where $L_{af}$ is the mutual inductance between a single phase winding and the field winding, $L_s$ is the synchronous inductance, $R_l$ is the alternator to battery cable resistance, $R_a$ is the alternator internal resistance, r is the radius of the pulley of the alternator, and $\omega_{egn}$ is the engine speed.

6. The method of claim 5 wherein $c_2$ is determined by the following formula:

$$c_2 = \frac{\left(2R_a - \frac{3}{\pi}r\omega_{egn}L_s + R_l\right)V_{set}}{2R_a + \frac{3}{\pi}r\omega_{egn}L_s}$$

where $L_s$ is the is the synchronous inductance, $R_l$ is the alternator to battery cable resistance, $R_a$ is the alternator internal resistance, r is the radius of the pulley of the alternator, $\omega_{egn}$ is the engine rpm, and $V_{set}$ is the voltage set point.

7. The method of claim 6 wherein each combination of values for $c_1$ and $c_2$ are determined for a respective voltage set point $V_{set}$ and engine RPM $\omega_{egn}$.

8. The method of claim 7 wherein each of the combination values $c_1$ and $c_2$ are determined using a recursive least square function.

9. The method of claim 8 wherein determining each of the combination values $c_1$ and $c_2$ using the recursive least square function comprises the steps of:
    (a) recording an engine rpm and voltage set point combination;
    (b) calculating values $c_1$ and $c_2$ using the recursive least square function;
    (c) fixing the values $c_1$ and $c_2$ when recursively updated values $c_1$ and $c_2$ converge; and
    (d) storing the fixed values $c_1$ and $c_2$ in the look-up table in combination with the recorded engine rpm and voltage set point if the determined values $c_1$ and $c_2$ converge, otherwise returning to step (a).

10. The method of claim 1 wherein an indicator is actuated on the vehicle for providing notification of the belt slip condition when a difference between the measured voltage and estimated voltage is greater than a threshold for a predetermined period of time.

11. A belt slip detection system for detecting a slippage of an accessory drive belt, the accessory drive belt engaging a rotatable member of an engine for driving a rotatable member of an alternator, the belt slip detection system comprising:
    a control module configured for determining a belt slip of the alternator as a function of a measured battery voltage and an estimated battery voltage, wherein the estimated battery voltage determined as a function an engine speed, wherein the control module determines whether the estimated battery voltage is greater than the measured battery voltage, and wherein the control module is configured to enable a driver-perceptible warning of the belt slip.

12. The belt slip detection system of claim 11 wherein the control module estimates the battery voltage using the following formula:

$$V_{b\text{-}est} = -c_1 F_{dc} + c_2$$

where $V_{b\text{-}est}$ is the estimated battery voltage, $F_{dc}$ is an alternator field duty cycle; $c_1$ is value based on a function of the engine rpm, and $c_2$ is a value based on a function of the alternator voltage set point.

13. The belt slip detection system of claim 12 further comprising a look-up table for storing a combination of values for $c_1$ and $c_2$, wherein the combination of values for $c_1$ and $c_2$ are stored in relation to an associated voltage set point $V_{set}$ and an engine RPM $\omega_{egn}$.

14. The belt slip detection system of claim 13 wherein the control module determines the value $c_1$ using the following formula:

$$c_1 = \frac{-\frac{3\sqrt{3}}{\pi}L_{af}R_l r\omega_{egn}}{2R_a + \frac{3}{\pi}r\omega_{egn}L_s}$$

where $L_{af}$ is the mutual inductance between a single phase winding and the field winding, $L_s$ is the synchronous inductance, $R_l$ is the alternator to battery cable resistance, $R_a$ is the alternator internal resistance, r is the radius of the pulley of the alternator, and $\omega_{egn}$ is the engine rpm.

15. The belt slip detection system of claim 14 wherein the control module determines the value $c_2$ using the following formula:

$$c_2 = \frac{\left(2R_a - \frac{3}{\pi}r\omega_{egn}L_s + R_l\right)V_{set}}{2R_a + \frac{3}{\pi}r\omega_{egn}L_s}$$

where $L_s$ is the synchronous inductance, $R_l$ is the alternator to battery cable resistance, $R_a$ is the alternator internal resistance, r is the radius of the pulley of the alternator, $\omega_{egn}$ is the engine rpm, and $V_{set}$ is the voltage set point determined by the engine control module.

16. The belt slip detection system of claim 15 wherein the control module determines the values $c_1$ and $c_2$ using a recursive least square function.

17. The belt slip detection system of claim 16 wherein the values $c_1$ and $c_2$ stored in the lookup table are determined by a learning program, the learning program identifies a respective voltage set point $V_{set}$ and engine RPM $\omega_{egn}$ combination at which values $c_1$ and $c_2$ are determined, the learning program uses the recursive least square function to calculate the values $c_1$ and $c_2$, the learning program identifies the values $c_1$ and $c_2$ when the recursively updated values $c_1$ and $c_2$ converge, the values $c_1$ and $c_2$ identified at convergence are stored in the lookup table along with the associated voltage set point $V_{set}$ and engine RPM $\omega_{egn}$.

18. The belt slip detection system of claim 11 wherein the control module is a battery control module.

19. The belt slip detection system of claim 11 further comprising a warning indictor for providing a notification of a determined belt slip condition when a difference between the measured voltage and estimated voltage is greater than a threshold for a predetermined period of time.

20. A method for determining belt slip in a vehicle, the vehicle including an engine and an alternator rotatably coupled by an accessory drive belt, the accessory drive belt engaging a rotating member of the engine for driving a rotating member of the alternator, the method comprising the steps of:
    measuring an engine speed;
    determining an expected alternator speed as a function of engine speed;
    measuring a battery voltage;
    determining a calculated alternator speed as a function of the measured battery voltage; and
    detecting belt slip in response to a comparison of the calculated alternator speed and the expected alternator speed.

* * * * *